US009455791B2

(12) United States Patent
Lawry et al.

(10) Patent No.: US 9,455,791 B2
(45) Date of Patent: Sep. 27, 2016

(54) FULL-DUPLEX ULTRASONIC THROUGH-WALL COMMUNICATION AND POWER DELIVERY SYSTEM WITH FREQUENCY TRACKING

(71) Applicant: RENSSELAER POLYTECHNIC INSTITUTE, Troy, NY (US)

(72) Inventors: Tristan J. Lawry, East Lyme, CT (US); Gary J. Saulnier, East Greenbush, NY (US); Kyle R. Wilt, Sand Lake, NY (US); Jonathan D. Ashdown, Greenwich, NY (US); Henry A. Scarton, Troy, NY (US); Andrew Gavens, Niskayuna, NY (US)

(73) Assignee: RENSSELAER POLYTECHNIC INSTITUTE, Troy, NY (US)

( * ) Notice: Subject to any disclaimer, the term of this patent is extended or adjusted under 35 U.S.C. 154(b) by 195 days.

(21) Appl. No.: 14/385,947

(22) PCT Filed: Mar. 21, 2013

(86) PCT No.: PCT/US2013/033317
§ 371 (c)(1),
(2) Date: Sep. 17, 2014

(87) PCT Pub. No.: WO2013/148464
PCT Pub. Date: Oct. 3, 2013

(65) Prior Publication Data
US 2015/0049587 A1    Feb. 19, 2015

Related U.S. Application Data

(60) Provisional application No. 61/686,023, filed on Mar. 29, 2012.

(51) Int. Cl.
*H04B 11/00* (2006.01)
*H04L 5/14* (2006.01)

(52) U.S. Cl.
CPC ............ *H04B 11/00* (2013.01); *H04L 5/14* (2013.01)

(58) Field of Classification Search
CPC .............................. H04L 5/14; H04B 11/00
See application file for complete search history.

(56) References Cited

U.S. PATENT DOCUMENTS 4,045,767 A * 8/1977 Nishihara ............ H04L 27/30
324/76.31
5,982,297 A * 11/1999 Welle .................. G08C 23/02
340/870.16

(Continued)

FOREIGN PATENT DOCUMENTS

EP          2832016 A4 * 12/2015 ............ H04B 11/00
WO    WO 2013148464 A1 * 10/2013 ............ H04B 11/00

*Primary Examiner* — Daniel Pihulic
(74) *Attorney, Agent, or Firm* — Notaro, Michalos & Zaccaria P.C.

(57) ABSTRACT

A method and apparatus provide simultaneous bi-directional communications through a barrier using a pair of piezoelectric transducers. Outside-to-inside transmission of differentially encoded binary data is only sampled at the inside when a known repeated bit in a Barker sequence is transmitted in the other direction. Differentially encoded data is translated based on the absolute value of differences between each signal envelope sample and the previous signal envelope sample. Inside-to-outside data is transmitted by varying an electrical load on the inside transducer to vary the proportion of a continuous wave signal it reflects. The reflected portion of the continuous wave changes the electrical impedance of the outside transducer and this change is measured and interpreted as binary data. Two frequency selection algorithms select minimally sufficient and then optimal frequencies for power and data transmission by a frequency stepping process.

21 Claims, 7 Drawing Sheets

(56) References Cited

U.S. PATENT DOCUMENTS

| | | | | |
|---|---|---|---|---|
| 6,037,704 A * | 3/2000 | Welle | | H04B 11/00 310/316.01 |
| 6,127,942 A * | 10/2000 | Welle | | H02J 17/00 340/870.16 |
| 6,317,389 B1 * | 11/2001 | Toda | | B06B 1/06 367/164 |
| 6,343,049 B1 * | 1/2002 | Toda | | H04B 11/00 310/313 B |
| 6,363,139 B1 * | 3/2002 | Zurek | | H04B 11/00 310/324 |
| 6,470,996 B1 | 10/2002 | Kyle et al. | | |
| 6,625,084 B1 | 9/2003 | Payton | | |
| 6,639,872 B1 | 10/2003 | Rein | | |
| 6,674,806 B1 * | 1/2004 | Toda | | H04B 3/54 340/12.33 |
| 6,717,983 B1 * | 4/2004 | Toda | | H04B 11/00 367/135 |
| 7,514,844 B2 | 4/2009 | Unkrich | | |
| 7,525,398 B2 | 4/2009 | Nishimura et al. | | |
| 7,586,392 B2 | 9/2009 | Unkrich | | |
| 7,894,306 B2 | 2/2011 | Bagshaw et al. | | |
| 7,902,943 B2 | 3/2011 | Sherrit et al. | | |
| 8,605,548 B2 | 12/2013 | Froelich | | |
| 2002/0125995 A1 * | 9/2002 | Toda | | H03H 9/6406 340/5.64 |
| 2002/0149483 A1 * | 10/2002 | Shanks | | G06K 7/0008 340/572.1 |
| 2003/0213306 A1 * | 11/2003 | Toda | | G01N 29/022 73/651 |
| 2005/0017873 A1 * | 1/2005 | Liu | | G01M 5/0008 340/870.01 |
| 2010/0027379 A1 | 2/2010 | Saulnier et al. | | |
| 2015/0034305 A1 | 2/2015 | Tips | | |
| 2015/0049587 A1 * | 2/2015 | Lawry | | H04L 5/14 367/87 |

* cited by examiner

FULL-DUPLEX ULTRASONIC THROUGH-WALL COMMUNICATION AND POWER DELIVERY SYSTEM WITH FREQUENCY TRACKING

CROSS-REFERENCE TO RELATED APPLICATION

Applicant hereby claims priority on U.S. Provisional Patent Application 61/686,023, filed on Mar. 29, 2012, which is incorporated herein by reference.

GOVERNMENT LICENSE RIGHTS

This invention was made with government support under contract number DOE Contract #: DE-KN6000590 awarded by the Department of Enemy. The government has certain rights in the invention.

FIELD AND BACKGROUND OF THE INVENTION

The present invention relates generally to the field of transducer communication through walls, and in particular to simultaneous bi-directional communication between a single pair of piezoelectric transducers.

A transducer is a device that converts one form of energy to another. Transducers may be used, among other functions, to transmit and receive data and power across a solid barrier without requiring any holes in the barrier. Conceptually, this can be done by a first transducer on one side of a barrier turning electrical energy into mechanical energy, the mechanical energy traveling across the barrier, and being received by a second transducer on the other side of the wall which converts some portion of the mechanical energy back into electrical energy. This ability is particularly useful for transmitting energy and data through barriers like ship and submarine hulls, pressure vessel tanks, and other walls separating extreme environments where it is undesirable to create physical openings for wires.

Ideally, transducer devices should be attached directly to the communications barrier, though many arrangements are possible. It is generally desirable to have a smooth, uninterrupted, uniform barrier between coupled transducers.

Published patent application US2010/0027379, published Feb. 4, 2010 and incorporated herein by reference, discloses an ULTRASONIC THROUGH-WALL COMMUNICATION (UTWC) SYSTEM for communicating digital information through a barrier in the form of a thick metal wall, using ultrasonic techniques so that no through-holes are needed in the barrier. Using this system, signals can be transmitted through the barrier. For example, sensor signals that monitor conditions on one side of the barrier can be transmitted to the other side of the barrier. The barrier may be the wall of a pressure vessel and the conditions to be monitored may be those of a hostile, high temperature and high pressure, gaseous or liquid environment in the pressure vessel.

U.S. Pat. No. 7,902,943 to Sherrit et al. discloses a WIRELESS ACOUSTIC-ELECTRIC FEED-THROUGH FOR POWER AND SIGNAL TRANSMISSION including a first piezoelectric transducer to generate acoustic energy in response to electrical energy from a source, and a second piezoelectric transducer to convert the received acoustic energy to electrical energy to be used by a load.

U.S. Pat. No. 7,894,306 to Martin et al. for an APPARATUS AND METHOD FOR DATA TRANSFER THROUGH A SUBSTRATE discloses transferring data through a submarine hull or other solid boundary using high frequency acoustic signals to avoid penetration of the hull or boundary.

U.S. Pat. No. 5,982,297 to Welle discloses an ultrasonic data communication system including first and second transducers coupled together through a coupling medium for communicating input and output undulating pressure waves between the transducers for the transfer of input and output data between an external controller and an embedded sensory and actuating unit. An internal processor powers the second embedded transducer to generate ultrasonic waves into the medium that are modulated to send the data from the embedded sensor so that considerable energy is needed for the embedded circuits.

Also see U.S. Pat. Nos. 6,625,084; 6,639,872; 7,514,844; 7,525,398 and 7,586,392 for other approaches to the transmission of data or power through a barrier using ultrasound.

A more comprehensive approach to wireless data and power transmission through a barrier is taught by R. Primerano in "*High Bit-rate Digital Communication through Metal Channels*," PhD dissertation, Drexel University, July 2010, hereafter referred to as Primerano. Without conceding that Primerano is prior art to the invention disclosed in the present application, Primerano is interesting because it teaches Orthogonal Frequency-Division Multiplexing or OFDM modulation with a cyclic prefix to send data at a high rate through a metal wall using ultrasound. The use of OFDM compensates for signal loss due to echos caused by boundaries or due to other incongruities across the channel. Primerano does not, however, teach a system that simultaneously delivers power in one direction while data is transmitted in one or both directions.

Using transducers to send vibrational signals through a wall presents special challenges. Unlike more traditional arrangements, separate channels, such as separate wires, cannot easily be provided to segregate communication between different components and in different directions between the same components, or even to segregate power transmission from signal transmission. All communications—in both directions—must be passed through the same solid wall.

Prior-art arrangements have provided a plurality of transducer pairs aligned across a single wall to create multiple channels for communication of signals and transfer of power. Different transducer pairs can be used and designed for different purposes. Multiple transducer pairs can, however, add complexity and expense, will typically require greater surface area for mounting, and may be difficult to align on opposite sides of the communication wall. Multiple transducers can also interfere with each other since they are still passing vibrations across the same substrate. As a result, arrangements including multiple pairs of transducers are not desirable for all applications.

Using only a single pair of transducers presents other difficulties. The same section of wall and same pair of transducers must be used both to send and to receive power and to send and receive information. Further, it will often be desirable to send energy and/or information through the wall in both directions at once. Vibrations simultaneously sent through a section wall in opposite directions will often cancel and/or interfere with each other.

As a result, there is a need for improved methods and arrangements to simultaneously send accurate communications in both directions, through a single section of wall, using only a single pair of aligned transducers. It is particularly desirable to provide a system able to correct for interaction between a received signal and a signal sent simultaneously in the opposite direction through the same carrier.

SUMMARY OF THE INVENTION

It is an object of the present invention to provide simultaneous communication in both directions through a barrier using only one transducer on each side of the barrier. It is also a goal of this invention to interpret vibrational signals which are subject to interference from other vibrational signals being sent simultaneously through the same carrier in the opposite direction. It is a further goal of this invention to select optimal frequencies for simultaneously transmitting signals and power between transducers, and to continuously optimize the frequencies.

Accordingly, a system and apparatus for communicating from the outside to the inside of a barrier is provided using an outside transducer to send amplitude-varied, differentially encoded commands to an inside transducer. A differential encoding system using binary addition encodes binary commands before transmission through the barrier. Signals received at the inside are only sampled when a known, repeated bit is sent from the inside to the outside so that the inside-to-outside interference with the outside-to-inside signal will be consistent between readings. Signal readings at the inside are decoded based on whether they are the same or different from the most recent previous signal reading, and not based on the specific level of the signal. As a result, the outside-to-inside signal can be interpreted despite inside-to-outside signal interference because the inside-to-outside interference will be the same for successive readings, and thus changes between successive readings can be attributed to the outside-to-inside signal itself. Signals received on the inside are interpreted into commands which are used to control internal electronics.

A complementary inside-to-outside communication system and method is provided based on a continuous wave carrier signal applied from the outside wall. A continuous wave having constant amplitude and frequency is applied from the outside wall. A varying electrical load is applied to the inside transducer to alter its acoustic impedance to communicate binary data to the outside. The inside transducer reflects varying fractions of the vibrational continuous wave back towards the outside transducer because of this varying acoustic impedance. These varying vibrational reflections impact and change the electrical impedance of the outside transducer, and its varying electrical impedance is measured and translated into binary data at the outside. Further, the outside receiver knows the strength of the outside-to-inside signal because it directly produces that signal. As a result, the outside receiver can easily correct the reflected inside-to-outside signal it receives back for interference by the known outside-to-inside signal.

The invention also provides a two-part frequency selection and tracking algorithm for selecting carrier frequencies best suited for transmitting both power and data through a given barrier at a given temperature. An initial frequency selection algorithm first finds a frequency that, with the smallest amount of power applied to the outside wall, provides sufficient power to the inside electronics to enable them to turn on and send a detectable signal back to the outside. A second optimization and tracking algorithm is then used to step through a range of frequencies and find a frequency that is optimal, and not merely sufficient, for providing power through the wall. The second algorithm may be run continuously or periodically while a transducer system is in operation to continuously adjust the frequency as the barrier properties change in response to changing conditions.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
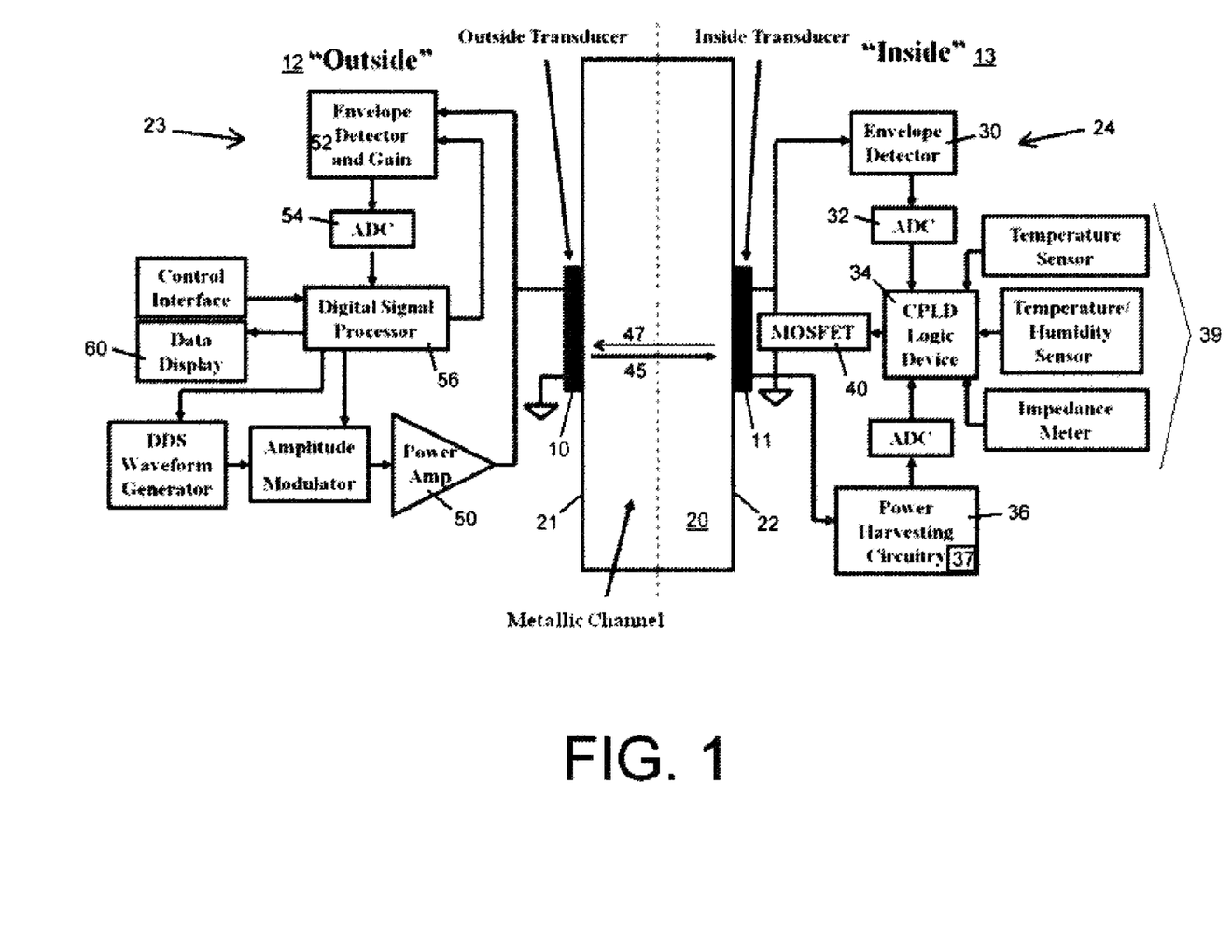
FIG. 1 is an overview diagram of a full-duplex two-way ultrasonic communication system.
Figure 2:
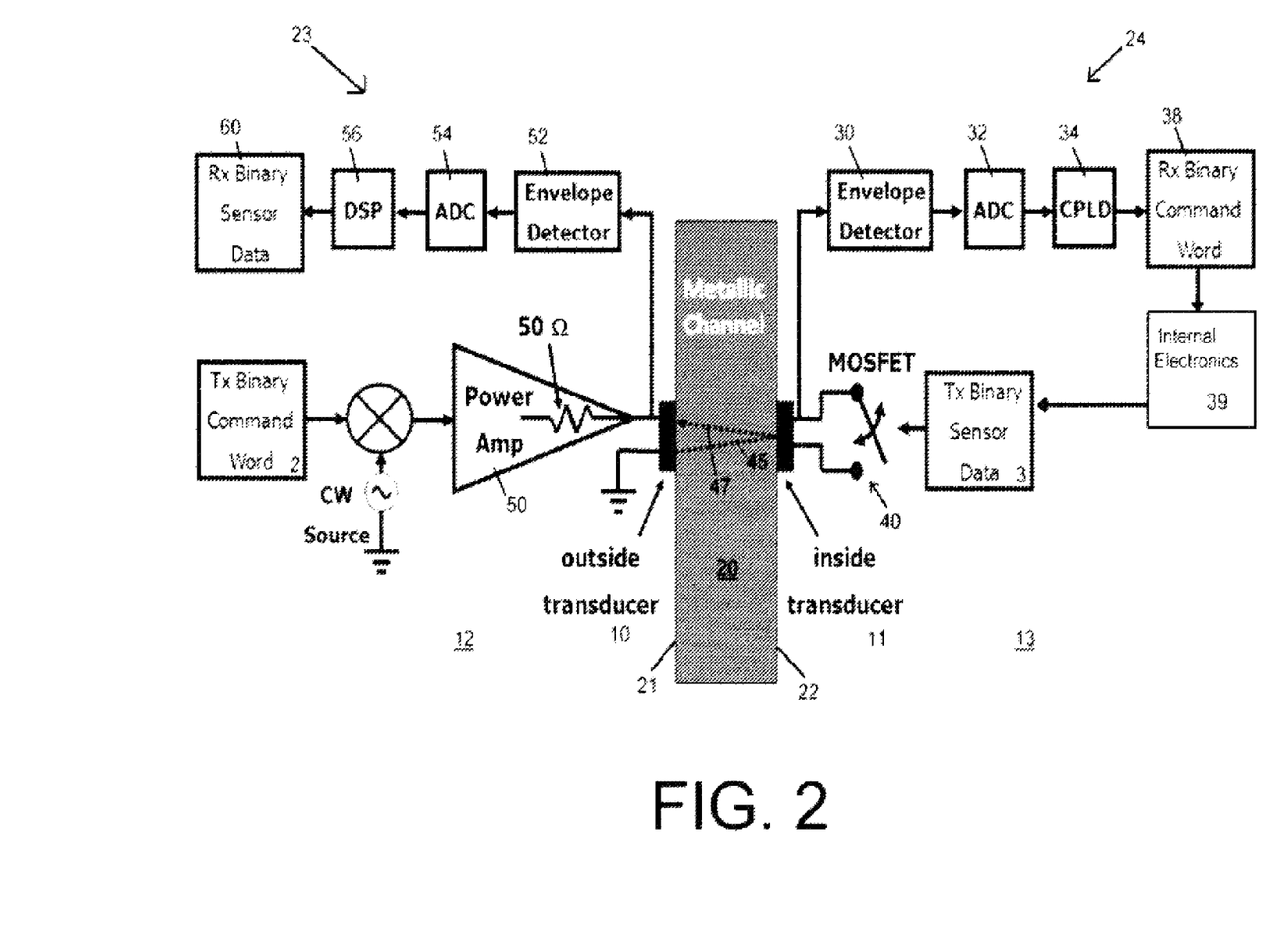
FIG. 2 is a block diagram of a full-duplex two-way ultrasonic communication system.

This disclosure details a protocol which enables simultaneous communication through metallic barriers using a single pair of piezoelectric transducers mounted on opposing sides of a metallic barrier. As shown in FIGS. 1 and 2, the system allows for the communication of commands 2 from the outside to the inside of barrier 20, across the acoustic-electric channel between the transducers 10 and 12 such as to control internal electronics 39, although the system can be adapted to different applications. Such a system is highly desirable since the only other option for changing the mode of operation of the inside electronics would be to power down the system, remove the sealed electronics from containment, and reconfigure the mode as desired. A full-duplex (simultaneous two-way) communication protocol is described herein that allows for communication of user-generated commands 2 from the outside of a metal vessel (on the left side in FIGS. 1 and 2) to the enclosed (inside) electronics 39 (on the right in FIGS. 1 and 2). Simultaneously, sensor data 3 and system performance data 3 are sent in the opposite direction, i.e., from the inside of the metal enclosure to the outside. In this way, the mode of operation of the enclosed electronics including sensors may be set dynamically by a user on the outside without the need to physically access the enclosed system.

Referring now to the drawings in greater detail, in which like reference numerals are used to refer to the same or similar elements, FIG. 1 shows a system level overview of a preferred full-duplex two-way ultrasonic through-wall communication (UTWC) system with power harvesting. FIG. 2 shows a block diagram of a similar system further illustrating a method by which full-duplex two-way communication can be achieved.

The system uses a pair of coaxially aligned outside 10 and inside 11 piezoelectric transducers mounted on opposing outer 21 and inner 22 sides of the metal wall 20. The area and components on the side of the outer side 21 of the wall are collectively referred to as the outside 12, and the area and components inside the wall 20 are collectively referred to as the inside 13. The metal wall 20 serves as a channel for transmitting vibrations. In a preferred implementation, the transducers 10, 11 are unpackaged, undamped, electrode insulated resonant crystals, although other arrangements and transducers may be used. The crystals of the transducers are preferably attached to the steel wall using epoxy with a thin intermediate layer of polymer for electrical isolation.

Outside to inside communication through the wall 20 is accomplished by modulating the amplitude of a vibrational carrier signal 25 produced by the outside transducer 10. The vibrational carrier signal 25 is preferably used to transmit a differentially encoded binary command word which is then received by the inside transducer 11. Differential encoding is explained below. Preferably the carrier signal 25 also conveys power through the wall which is harvested using power harvesting circuitry 36 which preferably includes one or more power harvesting capacitors 37.

The envelope of the vibrational carrier signal 25 received by the inside transducer 11, a.k.a. the "carrier signal envelope", is then determined using an envelope detector circuit 30 on the same side of the wall 20 as the inside transducer 11. The "envelope" of a rapidly varying signal is a smooth curve outlining its extremes in amplitude. The recovered carrier signal envelope is then sampled using an analog-to-digital converter 32 (ADC). Reading a point on the relatively smooth carrier signal envelope, instead of a point on the rapidly oscillating carrier signal 25 itself, provides a more accurate reading of overall signal amplitude variation because it does not matter when in each vibrational cycle the sample is taken. Preferably the outside-to-inside carrier signal envelope is sampled at regular intervals timed to coincide with regular, periodic inside-to-outside transmission of a specific Barker sequence bit having a consistent amplitude. As discussed in greater detail below, this aspect of the invention allows for accurate correction of interference caused by inside-to-outside signal transmission.

A Complex Programmable Logic Device 34 (CPLD) or another similar unit is used to recover the command word from a series of carrier signal envelope samples. The carrier signal envelope samples represent differentially encoded binary commands, not standard binary representations of the command word, and so must be differentially decoded by a process detailed below. Referring again to FIG. 2, once the recovered command word 38 is determined, it may then be used to control the desired mode of operation of various inside electronics including setting the inside-to-outside data rate, also discussed below. Different binary sequences corresponding to different command words may be used to initiate different modes of operation of the inside board, although other types of information and instructions can be conveyed using this method.

Binary data is conveyed in the opposite direction, from inside to outside, by applying a continuous-wave (CW) carrier 45 to the outside 21 of the wall, and measuring the varying amounts of the CW carrier 45 reflected by the inside transducer 11. The continuous wave carrier has a known and continuous amplitude and frequency. The ability of the inside transducer 11 to absorb or reflect vibrational energy—its "acoustic impedance"—is varied by altering the electrical load of the inside transducer. Varying the acoustic impedance varies the proportion of the continuous wave carrier 45 that is reflected by the inside transducer back towards the outside transducer 10. The varying level of the continuous wave reflections 47 are detected by the outside transducer 10 and ultimately interpreted into usable data.

The electrical load on the inside transducer 11 can be varied by a variety of methods known in the art. In a preferred embodiment a metal oxide semiconductor field-effect transistor 40 (MOSFET), directly or indirectly linked to the inside transducer, is used. Turning the MOSFET 40 on and off corresponds to a binary "1" and binary "0", respectively. When the continuous-wave (CW) carrier 45 that is applied to the outside wall 21 travels through the wall to the inside transducer 11, some energy is reflected and some is absorbed by the inside transducer, the ratio of which is dependent on the acoustic impedance of the inside transducer. The portion of the energy which is reflected is the continuous wave reflection 47. Changing the electrical load on the inside transducer 11 alters its acoustic impedance, changing the ratio of reflected to absorbed energy, thereby modulating the size (or amplitude) of the reflected signal 47. See inset in the upper left of FIG. 6.

This modulated continuous wave reflection 47 then re-crosses the wall 20 and interacts with the outside transducer 10, altering the outside transducer's electrical input impedance. Electrical impedance is the measure of the opposition that a circuit presents to the passage of a current when a voltage is applied. Theses variations in the electrical input impedance of the outside transducer 10 constitute communications from the opposite inner side of the wall 20, typically binary, and can be detected and translated into useful information by any known method.

In a preferred embodiment, the changes to the electrical input impedance of the outside transducer 10 are detected using the output of a power amplifier 50 (PA). This electrical impedance change can be monitored via a voltage divider formed by the power amplifier 50 source impedance (approximately 50Ω in this example) and the changing electrical impedance of the system input. Consequently, the changes in the electrical impedance of the outside transducer 10, corresponding to the variations in the reflected signal 47, result in variations of the voltage amplitude measured across the outside transducer's electrodes. These amplitude variations represent the binary data being sent from the inside, which may be recovered using an envelope detector circuit 52 on the outside. The output of the envelope detector 52 is in turn sampled, preferably using an analog digital converter 54 (ADC). The resulting samples are then processed by a digital signal processor 56 (DSP) to recover the data 60.

Communication Protocol

Data or instructions being sent though the wall 20 are typically converted to binary form as part of the process. For example, when a device such as a sensor on the inside outputs an analog signal, the signal is sampled and quantized using an ADC 32 and converted into a stream of binary data (1s and 0s) in preparation for being transmitted from the inside to outside. If a device or sensor outputs digital data, it is directly converted into a binary stream. These "bits" of data are concatenated with each other, with a binary synchronization sequence, and potentially with other information, to form a "packet" or frame of data.

Broadly speaking, a data packet commonly consists of two kinds of data: control information and user data (also known as payload). The control information provides data the system needs to deliver or implement the user data, for example: source and destination addresses, error detection codes like checksums or echos, and sequencing information. Typically, control information is found in packet headers and/or trailers, with payload data in between.

Figure 3:
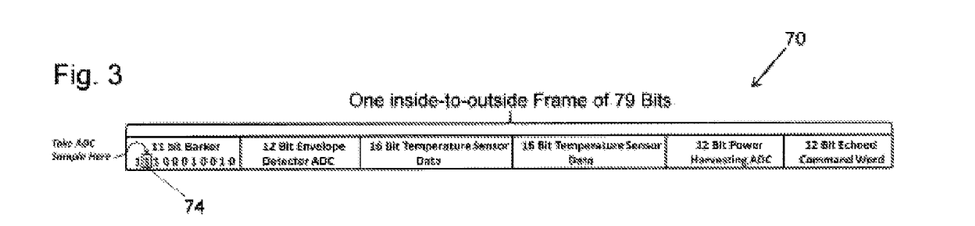
FIG. 3 is a diagram of a frame or packet of data for inside-to-outside communication.

FIG. 3 is an illustrative example of a packet 70 of data for inside-to-outside communication in the present invention. This frame contains a total of 79 bits. An eleven bit Barker sequence 72 (a type of control information) is at the beginning of each frame, followed in this example by four sensor readings, two from ADCs 32 and two from digital temperature sensors. The packet 70 also includes an echo of the latest 12-bit command that was sent in from the outside, making it possible for the outside to verify that a command has been received correctly. The number of bits per inside frame may be changed, such as if additional sensor measurements, or a larger number of command words, are desired. The bits in the inside-to-outside packet turn the MOSFET in FIGS. 1 and 2 "on" or "off" which, in turn, changes the fraction of the continuous-wave carrier 45 (which is applied to the outside 21 of the wall) that is reflected by the inside transducer 11 on the inside wall 22, thereby transmitting the bits to the outside by varying the size of the continuous wave reflection 47.

Figure 4:
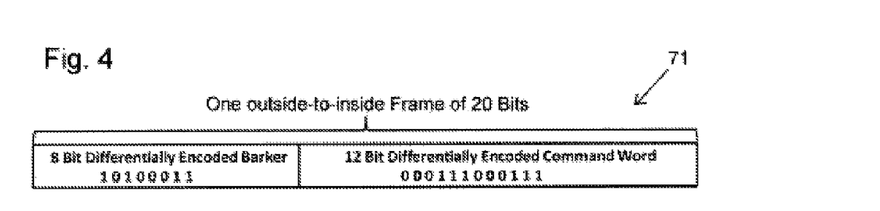
FIG. 4 is a diagram of a frame of data for outside-to-inside communication.

The data sent from the outside to the inside is also preferably configured as a packet 71 with a leading Barker sequence, as shown in FIG. 4. The packet data is differentially encoded to make it easier for the inside system to accurately receive the bits being sent. In this example packet, a 12-bit command follows the 7-bit Barker sequence, though the Barker sequence is extended by one bit to 8 bits (an arbitrary start bit) through the differential encoding. The 12-bit command word uses the last bit of the differentially encoded Barker sequence as its start bit for differential encoding and therefore does not require an additional bit.

As described above, both inside-to-outside and outside-to-inside communication are performed using amplitude modulation (AM). As a result, the carrier signal envelopes will often reflect the overlay of transmissions in both directions. It is crucial that the two receivers, i.e., the outside receiver 23 and the inside receiver 24, be able to separate the amplitude modulation introduced by the other transmitter from its own transmission in order to communicate in both directions simultaneously. The term "receivers" refers collectively to all of the components involved in receiving, processing, and interpreting communications from the opposite side of the wall, including transducers, envelope detectors, sampling and logic components, etc.

Correcting Inside-to-Outside Signals

The outside transmitter generates the (outside-to-inside) carrier signal 25 itself, and thus knows exactly how it is varying the amplitude of the carrier when it sends the data. Consequently, when interpreting the continuous wave reflection 47 signals from the inside, the outside receiver can simply adjust its gain in an inverse way to remove the transmitted data 25 (i.e. the outside-to-inside carrier signal) from the received signal 47. See the signals 45, 47, and 25 in FIGS. 1 and 2 to better understand this conceptually. For instance, if the carrier amplitude 25 is reduced by 10% (i.e. a gain of 0.9) to send a "0" and left unchanged to send a "1", the outside receiver should increase its gain for received signals 47 by 11.1% (i.e. a gain of 1/0.9) whenever a "1" is sent to the inside.

Correcting Outside-to-Inside Signals

Since the inside system sends data to the outside by varying the reflection coefficient of the inside transducer 11 at the inside wall 22 by an unknown amount, and since the inside does not control the strength of the continuous wave carrier 45, the inside does not precisely "know" the strength of the reflected signal 47 it is sending back through the wall. Thus, it is more complicated for the inside system to remove its own amplitude modulation from the signals it receives from the outside. While it would be possible for the inside system to use a correlation between the amplitude changes and its known transmit data to estimate how to adjust the inside receiver gain in order to remove its own reflected modulation, a simpler approach is preferred. In many target applications, it is desirable for the inside system to use as little power as possible, making it advantageous to use low complexity techniques.

The invention solves this problem by the inside system only sampling the outside-to-inside carrier signal envelope when a particular regularly-repeated bit, having a relatively consistent amplitude, is being sent from the inside to the outside. The outside-to-inside signal can then always be interpreted based on the assumption that the interfering inside-to-outside signal will be the same for successive readings. The approach also takes advantage of the fact that the outside system knows the data rate for the inside system, and so is able to synchronize the outside-to-inside data rate with the inside-to-outside data rate. The outside knows the inside-to-outside data rate because the clock for the inside system is derived from the vibrational carrier signal 25 (used to send commands from the outside) using a comparator, meaning that it has exactly the same frequency. The inside-to-outside data rate is selected by frequency dividing this clock, making the inside-to-outside data rate a sub-multiple of the outside-to-inside carrier 25 frequency. A sub-multiple is an integer that is an exact divisor of another integer –2 and 4 are both sub-multiples of 16, for example. Different dividing factors are used to produce different inside-to-outside data rates. In the preferred implementation, the inside-to-outside data rate is determined by dividing down the carrier frequency by a power of 2. That is:

$$DR_{I/O} = \frac{f_{Carrier}}{2^\alpha} \quad (1)$$

where $DR_{I/O}$ is the inside-to-outside data rate, $f_{Carrier}$ denotes the carrier signal 25 frequency, and $\alpha$ denotes the power of two corresponding to each desired data rate. Table 1 shows the values of $\alpha$ for various data rates based on a nominal carrier frequency of 1 MHz.

TABLE 1

Inside-to-Outside Data Rate and Corresponding
$\alpha$ (Calculated Using 1 MHz Carrier)

| $DR_{I/O}$ (kbps) | $\alpha$ |
|---|---|
| 2 | 9 |
| 4 | 8 |
| 8 | 7 |
| 16 | 6 |
| 32 | 5 |

To make it easy for the inside system to detect the amplitude changes that represent the outside-to-inside data transmissions, the outside-to-inside data rate is preferably a sub-multiple of the inside-to-outside packet rate. As shown above, the present example has 79 bits in a packet, so the packet rate is the data rate divided by 79. For the case where the outside-to-inside data rate, $DR_{O/I}$, equals the packet rate, $DR_{O/I}$ may be written as:

$$DR_{\frac{O}{I}} = \frac{1}{BitsInFrame} \frac{f_{Carrier}}{2^\alpha} \quad (2)$$

This relationship between the outside-to-inside data rate and the inside-to-outside packet rate makes it possible for the inside system to always sample the outside-to-inside data envelope at the same point in the inside-to-outside packet transmissions. As a rule, each successive outside-to-inside envelope sample will reflect the actual outside-to-inside signal plus overlaid inside-to-outside signal interference. By always sampling at a repeated point, the interference due to the inside-to-outside transmissions will always be roughly the same. As long as the interference is always the same, it is not essential to quantify the specific amount of interference to decode the signal. A bit in the inside-to-outside packet transmission that is periodically repeated should be selected. For example, referring to FIG. 3, by sampling at the same point 74 in a Barker sequence when the inside-to-outside transmitted bit 74 is always the same—always a binary 1 in this case—it is possible to determine the amplitude variations actually produced by the outside-to-inside transmissions. This is because the amount of interference from the repeated inside-to-outside binary 1 transmission will be the same each time the outside-to-inside envelope is sampled, even if the specific amount of interference from the binary 1 transmission is not known. This method works because, as explained below, the outside-to-inside signal is decoded based on the differences between successive outside-to-inside envelope readings, and not based on the specific amount of each envelope reading.

In alternative embodiments the actual amplitude of interference due to the repeated inside-to-outside bit is known and corrected for, but this is not required to practice the invention.

In the case where $DR_{I/O}$ can be changed dynamically, i.e., α can be changed, it is possible to either adjust $DR_{O/I}$ each time $DR_{I/O}$ changes or to leave $DR_{O/I}$ constant and take ADC 32 samples of the inside envelope every $2^{(9-\alpha)}$ frames. The latter approach is preferred because it makes the processing easier. The default data rate was chosen to be the slowest inside-to-outside data rate, or nominally 2 kbps (α=9). Therefore, the outside-to-inside data rate remains fixed and is determined by Eqn. (2) to be approximately 25 bps, assuming a 1 MHz carrier frequency and a 79 bit inside-to-outside packet size.

Differential Encoding and Differential Detection

Figure 5:
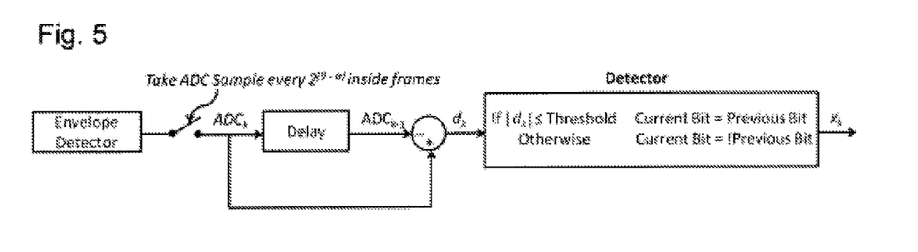
FIG. 5 is a block diagram of a system for decoding differentially encoded bits of an outside-to-inside transmission.

To make the detection of outside-to-inside command words insensitive to the specific carrier level, since the amount if inside-to-outside signal interference is typically unknown, a differential encoding and detection method is employed. Using this approach, the binary bits of the outside-to-inside transmission are differentially encoded before being transmitted through the channel via the carrier signal 25. In a binary differentially encoded system, an arbitrary start bit is assumed, and the transmitted data symbol $y_k$ is found through modulo-2 addition of the data bit $x_k$ with the last transmitted bit $y_{k-1}$. In equation form, this operation is represented as:

$$y_k = x_k \oplus y_{k-1} \quad (3)$$

where the symbol denotes binary or modulo-2 addition. Thus, the bit $x_k$ (a 0 or a 1) is the data bit to be communicated from the outside to the inside, but $y_k$ is the differentially encoded bit that is actually transmitted through the channel. To differentially detect the command on the receiver side, an analog-to-digital converter (ADC) sample of the inside envelope (reflecting the outside-to-inside signal plus an unknown-but-consistent level of interference) is taken every $2^{(9-\alpha)}$ frames and the difference between successive envelope samples is taken, i.e.:

$$d_k = ADC_k - ADC_{k-1} \quad (4)$$

where $d_k$ represents the difference between the $k^{th}$ and $(k-1)^{th}$ envelope samples, $ADC_k$ is the $k^{th}$ sample, and $ADC_{k-1}$ is the previous or $(k-1)^{th}$ sample of the inside envelope. It should be noted that $d_k$ can take on three possible states. State 1 is when two successive envelope samples have approximately the same value, i.e., $ADC_k \approx ADC_{k-1}$. In this case, $d_k \approx 0$ and there is no change in the bit state. State 2 is when $ADC_k$ is larger than ADC in which case the difference will be positive. State 3 is when $ADC_k$ is smaller than $ADC_{k-1}$, in which case the difference will be negative. A difference near zero indicates that there is no change in the previous bit state, while both positive and negative differences indicate that the transmitted data bit toggles the previous bit state. Thus, the absolute value of the difference is taken and is compared to an appropriate threshold in order to detect the incoming bits of the command word. If the absolute value of the difference between successive ADC readings is below the threshold, then the detected bit is the same as the previous bit. On the other hand, if the absolute value of the difference is greater than the threshold, then the detected bit is toggled from the previous state, either from 0 to 1 or from 1 to 0. This differential detection scheme is shown in FIG. 5.

It is worth emphasizing that interpreting the differentially detected bits does not depend on the actual values of $ADC_k$ and $ADC_{k-1}$, but rather on the difference between them. For this reason, the bits will be detected properly whether or not the actual data stream is inverted. Further, as discussed above, the signal actually detected at the inside wall 22 will reflect the incoming differentially encoded signal overlaid on the outgoing signal. However, the outside-to-inside signal envelope is always sampled at intervals when the interference by the repeated signal 74 traveling in the other direction will be the same, even though the specific amount of this overlay effect may be unknown.

The fact that the amount of inside-to-outside interference is unknown would be a problem for most systems. This invention solves the problem by first making sure that the interference is consistent, and then only reading the differences between consecutive signal envelope samples, as opposed to the specific values. Since the overlay effect is the same between samples, differences between successive samples are presumably due to the outside-to-inside signal alone. This works because the envelope sample changes will reflect changes in the vibrational carrier signal 25 from the outside, while the actual envelope values will still include the effect of the consistent-but-unknown bit 47, 74 simultaneously sent from the inside. Thus, the received signal either changes at least a certain amount compared to the previous reading, or it does not—the direction of the signal change, and specific amount of inside-to-outside interference, are both irrelevant in the preferred embodiment.

Synchronization

A goal of the two-way communication protocol described here is to minimize the complexity of the inside system. This goal is aided by not requiring the use of a synchronization algorithm. In the preferred embodiment, the outside system obtains the timing of the inside-to-outside packets by locating a Barker sequence that starts the packet. Under the assumption that the outside system also has approximate knowledge of the acoustic transit delay through the wall, i.e., the time it takes for the ultrasonic signal to pass through the wall, it is able to position the data transitions in the outside-to-inside transmission to ensure that the data will be valid when sampled at a pre-determined point in the Barker sequence on the inside. As observed on the inside, the outside-to-inside data transitions can occur at any point other than when the envelope is being sampled. That is, data transitions must not occur at the point in the Barker sequence at which we obtain samples of the envelope, as described above. If the outside-to-inside data bit changes at a particular place in the inside-to-outside data stream as it is observed on the outside, the change will be observed on the inside two acoustic transit delays after that point in sequence. Using an estimate of the transit delay, the outside system can easily locate the data transitions in the outside-to-inside transmissions to ensure that they occur away from the sampling point on the inside.

Performance

Figure 6:
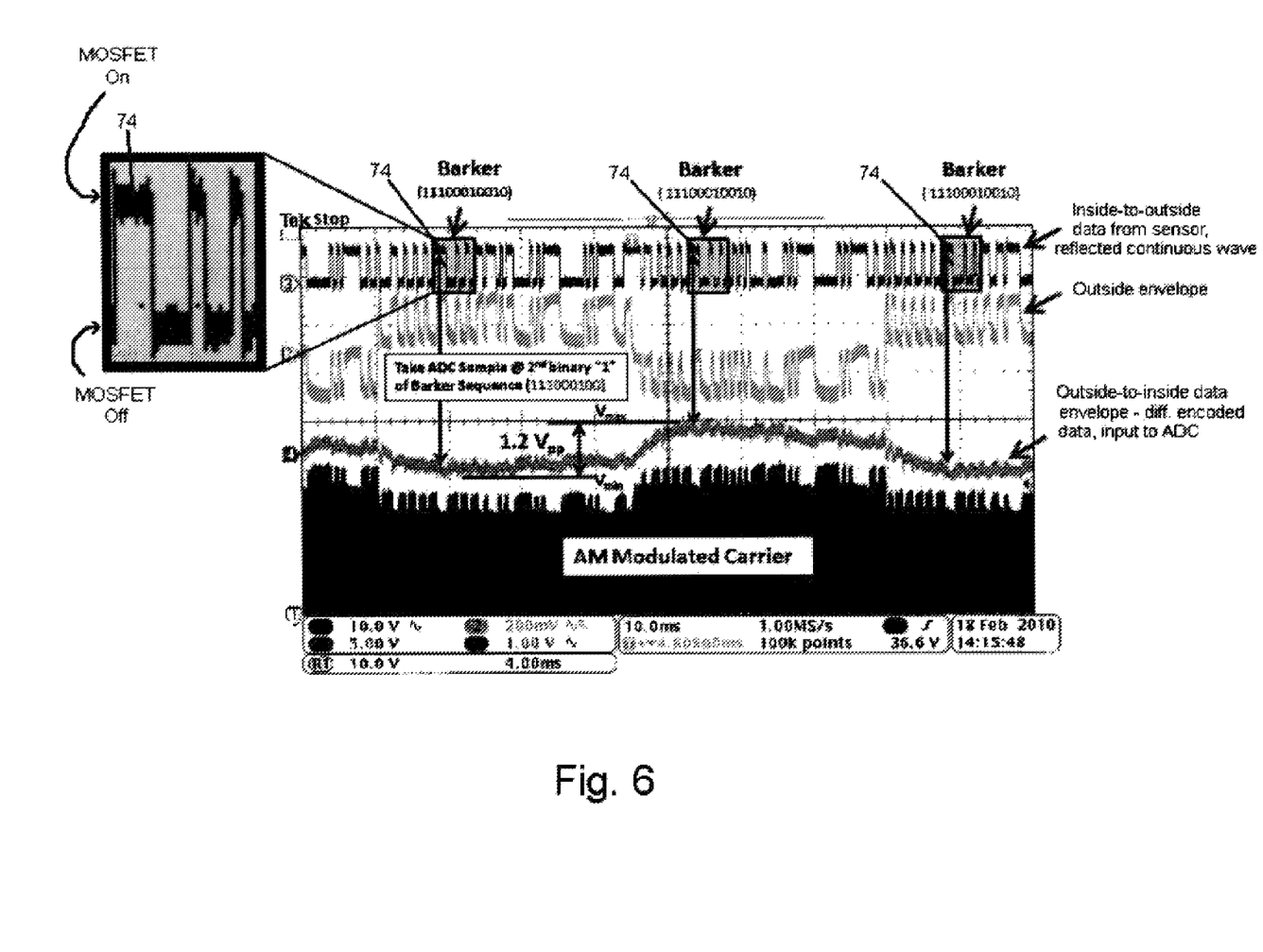
FIG. 6 is a plot of voltage over time for several signals relating to the full-duplex two-way communication system.

FIG. 6 shows waveforms taken using an oscilloscope of a full-duplex two-way communication system implemented according to this invention. The waveforms in this example illustrate various features of the invention described above.

The top trace of FIG. 6 shows the serial stream of binary data that forms the packets on the inside for inside-to-outside data transmission. The locations of the Barker sequences that mark the start of each packet are highlighted. The repeated bit 74 used to time sampling the outside data packet is also shown in this stream of data, though other repeated bits could be selected for use with this invention.

The bottom trace shows the upper portion of the carrier signal as observed on the outside wall 21. In this case, the outside-to-inside data bit rate equals the packet rate. Note that the carrier envelope shows both the inside-to-outside and outside-to-inside data, roughly equating the third from top trace (outside-to-inside transmission) with the top trace (reflected inside-to-outside data moving in the opposite direction) subtracted over time. The second trace from the top shows the envelope of the carrier at the outside as recovered using an envelope detector circuit. Again, the overlay of the two data streams is evident.

The third trace from the top shows the output of the envelope detector 30 on the inside 13, reflecting signal received from the outside. This envelope detector has a somewhat narrower bandwidth than the one on the outside because the outside-to-inside data rate is much lower. As a result, the inside-to-outside data is partially suppressed by the filtering. The arrows indicate the times when this envelope is sampled by the ADC, with reference to the Barker sequences shown in the top trace, obtaining the samples that are used by the differential detector to recover the outside-to-inside data bits. Note that in this example the outside-to-inside envelope ($3^{rd}$ trace) is always sampled when a binary 1 is being transmitted inside-to-outside ($1^{st}$ trace) so that the interference is approximately equal for each sample.

Frequency Selection/Tracking Algorithm

Most ultrasonic channels are frequency selective, meaning that some carrier frequencies will work well for transmitting data and power while other frequencies will not. This frequency selectivity is due to a combination of the frequency response of the piezoelectric transducers themselves and the standing waves set up in the steel wall. The longer the channel, the more rapidly the transfer function of the channel changes with changes in frequency. To obtain and maintain operation of the through-wall power delivery and communication, it is preferable to use an algorithm for initial frequency acquisition followed by a second algorithm for frequency optimization and tracking, as environmental changes may alter the channel response.

Initial Frequency Selection

The aim of the initial frequency selection algorithm is to find a frequency that, with the smallest applied power on the outside, will supply sufficient power to the inside board to enable it to turn on and send back packets of data that can be received and decoded at the outside. Since in the preferred embodiment each packet of data begins with a Barker sequence, the outside system will search for this Barker sequence to determine if the inside board has been activated. Once a Barker sequence is detected, the outside system will look for one or more subsequent Barker sequences at the expected time intervals, as determined by the packet length, to verify that the inside board is transmitting data.

The approach taken is to initially apply a low power carrier signal at the outside and step through a range of frequencies at this applied power level while searching for a Barker sequence in the envelope of the carrier received at the outside. Detecting such a Barker sequence indicates that the applied power level and frequency were successful in both powering and communicating with the inside system. Since the desired operating frequency will generally be near the resonance frequency of the piezoelectric transducers, the frequency search range is selected to bracket this resonance frequency. The size of the frequency steps are selected based on the thickness of the wall, with a thicker wall requiring smaller frequency steps due to the more rapid variations in transfer function with frequency. If the frequency sweep is completed without the Barker sequence being detected and verified, the applied power level is increased and another frequency sweep is performed. This process, incrementing the power level and performing a frequency sweep, is repeated until the activation of the inside board is verified.

Frequency Tracking Algorithm

The transfer function of the channel varies continuously with frequency, having a series of peaks and valleys corresponding to frequency regions of higher and lower transfer efficiency, respectively. Because the acquisition algorithm described above only tests discrete frequencies that are separated by the frequency step that is used in the frequency sweep process, the carrier frequency that is selected in the acquisition algorithm may not be optimal for either power transfer or communication. The acquisition algorithm is designed to determine a frequency on one of the higher peaks, but not necessarily at the top of that peak. A second optimization and tracking algorithm seeks to determine a frequency that is at the top of a peak and preferably to continuously adjust that frequency to track any changes in the peak frequency.

In general, frequencies that are good for power transfer are also good for communications. Additionally, it is usually less important to optimize the size of the communication signal, since it is only necessary to reach a threshold of essentially error-free communication of the data, and additional communications signal strength above that level does not give any added advantage. Consequently, in a preferred embodiment, the tracking algorithm seeks to maximize the power transfer from the outside to the inside and simply verifies adequate communications performance.

One way to assess the power transfer efficiency of the link is to monitor the voltage that is produced on a storage capacitor 37 in a power harvesting circuit 36. A larger voltage indicates a better power transfer efficiency while a lower voltage indicates a worse power transfer efficiency. Since carrier frequency selection is made on the outside and the power harvesting is performed on the inside, the voltage on the power harvesting capacitor must be communicated to the outside if it is to be used as part of a frequency selection algorithm. As a result, preferably the capacitor voltage is sampled and quantified, and a digital representation is sent to the outside within a data packet, giving the outside one sample of the voltage per packet length duration.

Once the carrier frequency acquisition algorithm finds a frequency that enables the inside board to power up and reliably communicate data to the outside, an optimization and tracking algorithm is preferably started. The optimization and tracking algorithm first steps the carrier frequency up or down by a small amount from either the starting or the most recent carrier frequency. A step of approximately 20 Hz is used in a preferred implementation having a nominal carrier frequency of 1 MHz, but many other steps are possible. The voltage level on the storage capacitor after the frequency step is compared to that before the frequency step. If the new value of the capacitor voltage is greater than the previous value, then the carrier frequency is changed again in the same direction, e.g., if an increase in frequency results in a larger capacitor voltage then the frequency is incremented up again. On the other hand, if the new voltage value is less than the previous value, then the carrier frequency is changed by the same frequency step in the opposite direction, back to its previous value. E.g., if increasing the frequency lowers the capacitor voltage, then the next frequency step will decrease the frequency by the same amount, back to its original value, presumably raising the voltage again, and the step after that will further reduce the frequency to see what voltage that produces. When the new and old values of the storage capacitor voltage are equal, the carrier frequency either remains the same or is arbitrarily incremented or decremented.

The result of running this algorithm is that the frequency is constantly changing, and slowly drifts towards a value that optimizes the voltage on the storage capacitor and, at the same time, optimizes the power transfer efficiency. The carrier frequency acquisition algorithm may be run only at setup, periodically, or, most preferably, constantly while the transducers are in operation.

Figure 7:
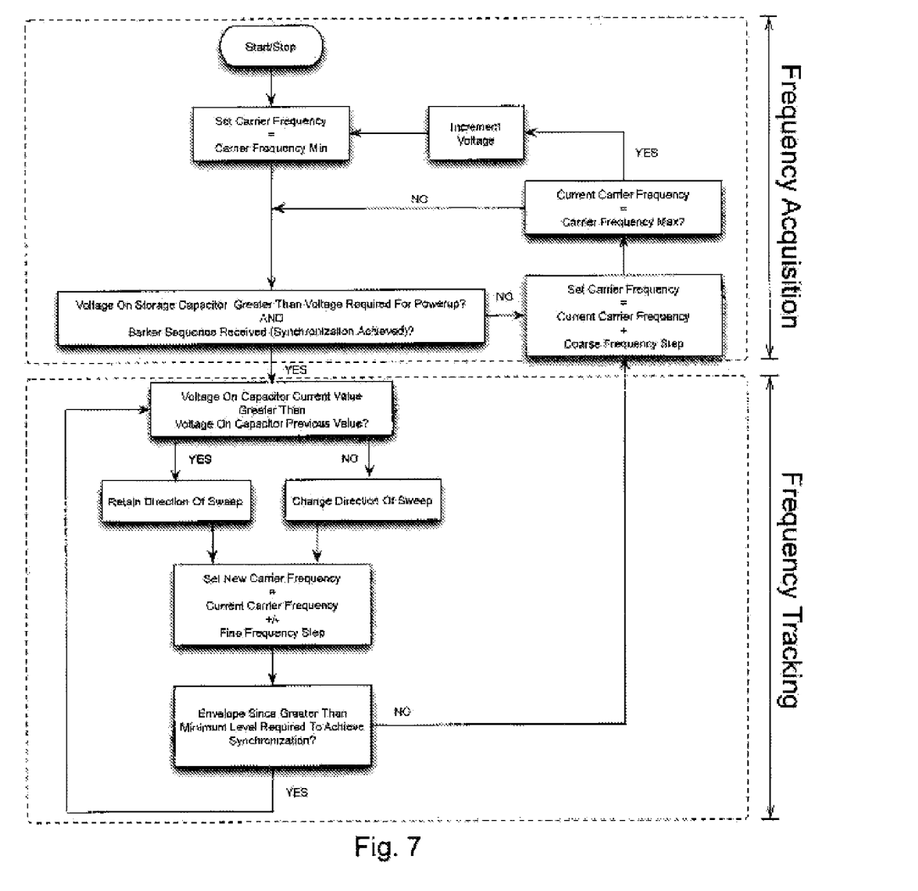
FIG. 7 is a flowchart diagram of a two-part algorithm for selecting frequencies suitable for communicating power and signals through a given surface.

Through system testing, it has been observed that, using the present implementation, data can be reliably detected at the outside with envelope changes on the order of 40 mV. (What exactly does the 40 mV envelope refer to? Storage capacitor? Signal received back from the inside?) To further ensure reliable communication, it is preferable to provide additional headroom, and the preferred minimum acceptable envelope size is 100 mV. Should the size of the envelope fall below this value during the frequency optimization process, the carrier frequency is changed by a coarse step, essentially returning to the acquisition process. The frequency stepping will continue until a new carrier frequency is found at which the envelope size is greater than 100 mV. At this point, the optimization algorithm will resume. A flowchart of a preferred frequency tracking algorithm is given in FIG. 7.

Figure 8A:
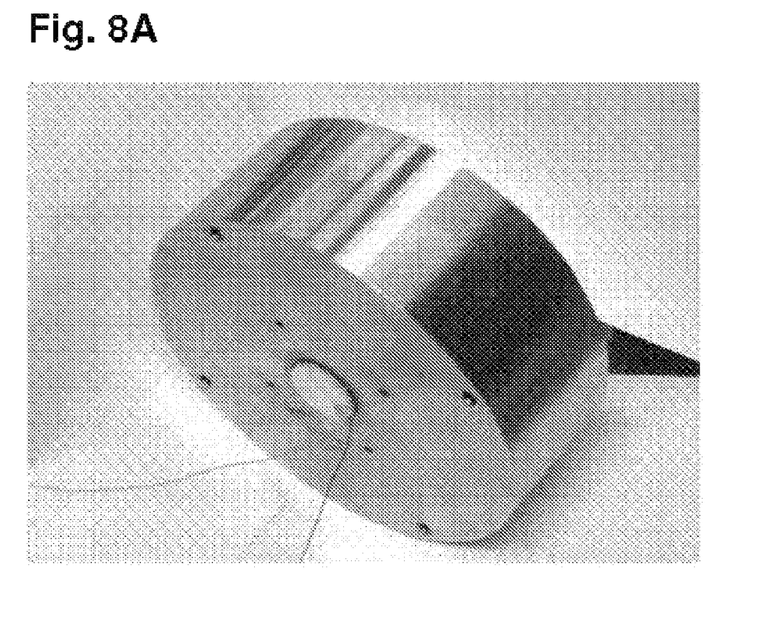
FIGS. 8A and 8B are two different top perspective views of piezoelectric transducers mounted on opposite sides of a steel surface.
Figure 8B:
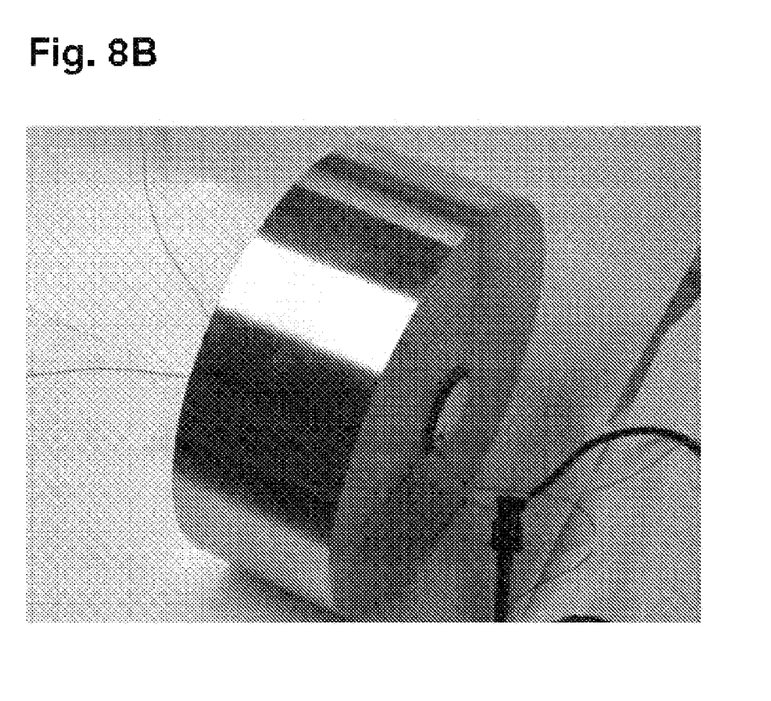

As temperature is increased, the properties of channels can change significantly. To test the frequency selection/tracking algorithm, 1 inch piezoelectric transducers with a nominal resonant frequency of 1 MHz were epoxied to a 2.25 inch thick cylindrical stainless steel (304ss) structure as shown in FIGS. 8a and 8b. Initial frequency selection was performed with the block at room temperature and, with the system operating continuously over a one hour time period, the block was gradually heated to approximately 83° F.

Figure 9:
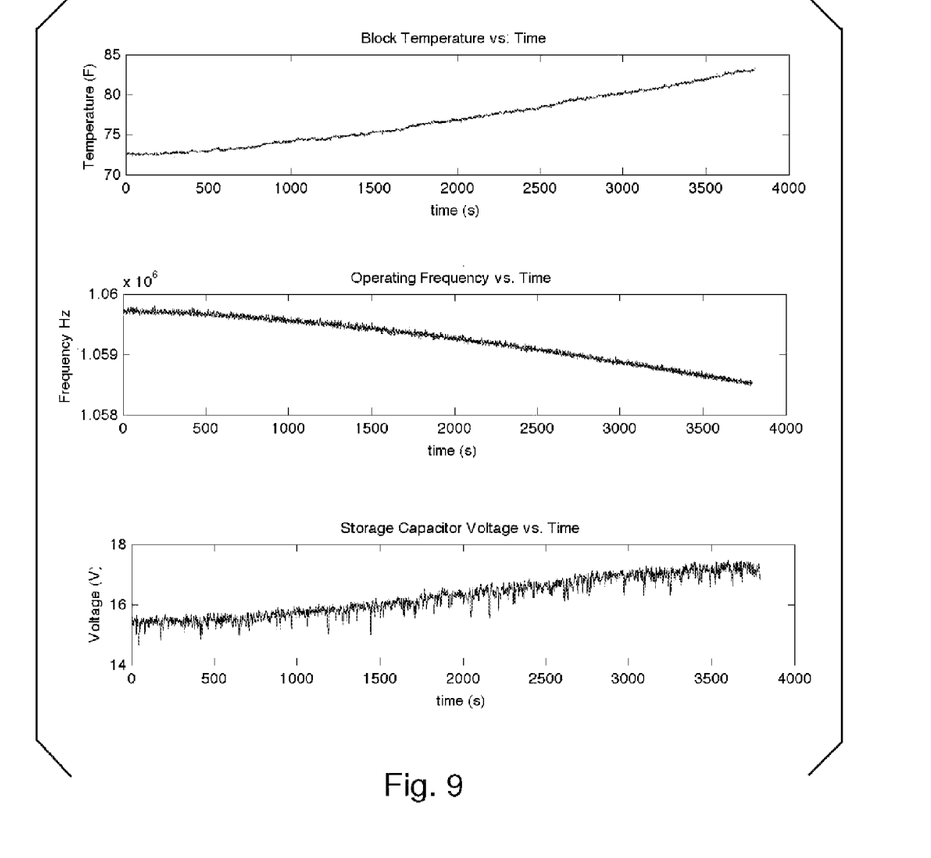
FIG. 9 is a set of three time-correlate graphs showing changes in operating frequency and storage capacitor voltage as the transducer assembly of FIGS. 8A and 8B is heated over time.

The results of the test are shown in FIG. 9. The top trace plots the temperature, the middle trace shows the carrier frequency selected by the algorithm, and the bottom trace shows the voltage on the storage capacitor. All traces are a function of time. As temperature is increased, the frequency tracking routine successfully adjusted the power and/or the frequency to maximize the voltage on the power harvesting capacitor. Although there is some fluctuation on the voltage capacitor due to the amplitude modulation of the carrier, it is apparent that the storage capacitor voltage increases over time, as desired.

It has been experimentally verified that the frequency tracking algorithm is effective. The algorithm of the present invention is important to reliable system operation in volatile environments where the temperature of the wall, the transducers, and other components may vary significantly. Since temperature changes have been observed to significantly change the properties of the channel, a single operating frequency is often insufficient over a wide temperature range. This algorithm allows the UTWC system to automatically adjust to changing environmental and channel conditions. In preferred embodiments the system parameters are consistently tracked, or at least regularly recalibrated, and the above algorithm is used to automatically adjust the system to ensure both adequate power delivery and reliable communication.

While a specific embodiment of the invention has been shown and described in detail to illustrate the application of the principles of the invention, it will be understood that the invention may be embodied otherwise without departing from such principles.

What is claimed is:

1. A method for simultaneous bi-directional communication through a metallic wall using a single pair of piezoelectric transducers, the method comprising the steps of:
   providing a metallic wall having an inner side and an outer side;
   providing coaxially aligned inside and outside piezoelectric traducers mounted on respective opposite sides of the metallic wall;
   communicating a differentially encoded binary command word from the outer side of the metallic wall to the inner side of the metallic wall by a first sub-process comprising the steps of:
   selecting a command word;
   translating the command word to binary bits;
   configuring the binary bits of the command word as part of a binary outside packet, the outside packet also comprising an incoming Barker sequence,
   translating the binary bits of the outside binary packet into differentially encoded bits using an algorithm comprising modulo-2 addition of each binary bit with the most recently transmitted differentially encoded bit;
   applying a carrier signal (25) to the outer side of the wall using the outside transducer, and modulating the amplitude of the carrier signal to communicate the differentially encoded bits of the outside packet, wherein the carrier signal is also adapted to transmit power to one or more devices on the inside of the wall;
   receiving the carrier signal at the inner side of the wall with the inside transducer;
   determining an envelope of the carrier signal received by the inside transducer, called a carrier signal envelope, using an inside envelope detector circuit;

periodically sampling the carrier signal envelope using an analog-to-digital converter (ADC), the periodic sampling being timed to coincide with a periodic transmission of a selected bit from the inner side to the outer side of the wall, wherein the selected bit falls within an outgoing Barker sequence, and wherein the periodic transmission of the selected bit have a consistent amplitude;

translating a plurality of consecutive envelope samples into a plurality of translated binary bits using a complex programmable logic device (CPLD);

wherein the translating step comprises determining whether an absolute value of the difference between each envelope sample and an immediately preceding envelope sample is above a threshold value, interpreting the envelope sample as a translated binary bit having the same binary value as an immediately preceding translated binary bit when said absolute value is below the threshold value, and interpreting the envelope sample as a translated binary bit having a different binary value than the immediately preceding translated binary bit when said absolute value is above the threshold value;

determining the command word using the plurality of translated binary bits; and using the command word to control electronics;

wherein an initial frequency and a minimum power level for the carrier signal (25) are selected using an initial frequency selection algorithm, the algorithm comprising the steps of:

applying a carrier signal having a power level and a frequency at the outer side (21) of the wall (20), and stepping through a range of carrier signal frequencies at the same power level while searching for a Barker Sequence in a data envelope sent back from the inner side (22) to the outer side (21) of the wall;

terminating the initial frequency selection algorithm if a Barker sequence is detected, the detected Barker signal indicating that the power level and frequency used most recently used were adequate to send power and communications through the wall; and increasing the carrier signal power level and stepping through the range of carrier signal frequencies again if no Barker sequence is detected, and repeating the steps of increasing the carrier signal power level and then stepping through the range of carrier signal frequencies until an initial frequency and minimum power level are found which result in detection of a Barker sequence sent from the inner side (22) of the wall;

wherein after the initial frequency and minimum power level are determined, the frequency of the carrier signal (25) is optimized and periodically adjusted to maximize power transfer from the outside transducer (10) to the inside transducer (11) using an optimization algorithm, the optimization algorithm comprising the steps of:

applying a carrier signal having said initial frequency and said minimum power level to the outer wall;

sampling and quantifying a voltage level of a power harvesting capacitor (36) on the inside (13) of the wall (20) and sending a digital representation of the voltage level, called a voltage reading, to the outside (12) within a data packet for use in the optimization algorithm;

stepping the carrier signal (25) frequency a small step in a first direction, the first direction being selected from one of up and down, and comparing the voltage level of the next new voltage reading with the voltage level of the previous old voltage reading;

stepping the carrier signal (25) frequency an additional step in the first direction if the new voltage reading is higher than the old voltage reading;

stepping the carrier signal (25) frequency a step in a second direction opposite the first direction if the new voltage reading is lower than the old voltage reading; and repeating the process of stepping the carrier signal frequency in the same direction when the previous step resulted in a higher voltage reading, and stepping the carrier signal in the opposite direction when the previous step resulted in a lower voltage reading;

the method for simultaneous bi-directional communication further comprising communicating binary inside data from the inside (13) of the metallic wall to the outside (12) by a second sub-process comprising the steps of:

providing a metal oxide semiconductor field-effect transistor which is linked to the inside transducer, the metal oxide semiconductor field-effect transistor having an on position corresponding to a binary value 1 and an off position corresponding to a binary value 0;

applying a continuous wave carrier to the outer side (21) of the wall via the outside transducer (10), the continuous wave carrier (45) traveling through the wall to the inside transducer (11), a fraction of the continuous wave being reflected by the inside transducer back towards the outer side of the wall, the reflected fraction being called a reflected wave (47);

altering an electrical load on the inside transducer by turning the metal oxide semiconductor field-effect transistor on and off, thereby modulating the acoustic impedance of the inside transducer and changing the strength of the reflected wave;

wherein the reflected wave interacts with the outside transducer, and thereby modifies the electrical input impedance of the outside transducer, so that the electrical input impedance of the outside transducer varies in response to the varying strength of the reflected wave;

monitoring variations in the amplitude of a voltage applied across the outside transducer, said variations corresponding to variations in the electrical input impedance of the outside transducer, and thereby also corresponding to the binary inside data from the inner side of the wall;

determining the envelope of the voltage applied across the outside transducer, termed a reflected signal envelope, using an outside envelope detector circuit;

sampling the reflected signal envelope using an analog to digital converter;

adjusting at least one of the reflected signal envelope and samples of the reflected signal envelope to correct for overlay between the reflected wave and the carrier signal from the first sub process; and processing reflected signal envelope samples with a digital signal processor to recover the binary inside data.

2. A method for simultaneous bi-directional communication through a metallic wall using a single pair of piezoelectric transducers, the method comprising the steps of:

providing a wall having an inner side and an outer side;

providing inside and outside traducers mounted on respective opposite sides of the wall;

communicating a differentially encoded binary outside signal from the outer side of the metallic wall to the inner side of the metallic wall by a first sub-process comprising the steps of:

selecting an outside signal;

translating the outside signal to binary bits;

configuring the binary bits of the outside signal as part of a binary outside packet, the outside packet also comprising an incoming Barker sequence, translating the binary bits of the outside binary packet into differentially encoded bits using an algorithm comprising modulo-2 addition of each binary bit with the most recently transmitted differentially encoded bit;

applying a carrier signal to the outer side of the wall using the outside transducer, and modulating the amplitude of the carrier signal to communicate the differentially encoded bits of the outside packet, wherein the carrier signal is also adapted to transmit power to one or more devices on the inside of the wall;

receiving the carrier signal at the inner side of the wall with the inside transducer;

determining an envelope of the carrier signal received by the inside transducer, called a carrier signal envelope, using an inside envelope detector circuit;

periodically sampling the carrier signal envelope using an analog-to-digital converter, the periodic sampling being timed to coincide with a periodic transmission of a selected bit from the inner side to the outer side of the wall, wherein the selected bit falls within an outgoing Barker sequence, and wherein the selected bit has a consistent amplitude;

translating a plurality of consecutive envelope samples into a plurality of translated binary bits using a logic device;

wherein the translating step comprises determining whether an absolute value of the difference between each envelope sample and an immediately preceding envelope sample is above a threshold value, interpreting the envelope sample as a translated binary bit having the same binary value as an immediately preceding translated binary bit when said absolute value is below the threshold value, and interpreting the envelope sample as a translated binary bit having a different binary value than the immediately preceding translated binary bit when said absolute value is above the threshold value;

determining the outside signal using the plurality of translated binary bits;

the method for simultaneous bi-directional communication further comprising communicating binary inside data from the inside (13) of the wall to the outside (12) by a second sub-process comprising the steps of:

providing a signal toggling arrangement which is linked to the inside transducer, the signal toggling arrangement having a first position corresponding to a binary value 1 and an second position corresponding to a binary value 0;

applying a continuous wave carrier to the outer side (21) of the wall via the outside transducer (10), the continuous wave carrier (45) traveling through the wall to the inside transducer (11), a fraction of the continuous wave being reflected by the inside transducer back towards the outer side of the wall, the reflected fraction of the continuous wave carrier being called a reflected wave;

altering an electrical load on the inside transducer by switching the signal toggling arrangement between its first and second positions, thereby modulating the acoustic impedance of the inside transducer and changing the strength of the reflected wave;

wherein the reflected wave interacts with the outside transducer, and thereby modifies the electrical input impedance of the outside transducer, so that the electrical input impedance of the outside transducer varies in response to the varying strength of the reflected wave;

monitoring variations in the amplitude of a voltage applied across the outside transducer, said variations corresponding to variations in the electrical input impedance of the outside transducer, and also corresponding to the binary inside data from the inner side of the wall;

determining the envelope of the amplitude of the voltage across the outside transducer, termed a reflected signal envelope, using an outside envelope detector circuit;

sampling the reflected signal envelope;

adjusting at least one of the reflected signal envelope and samples of the reflected signal envelope to correct for overlay between the reflected wave and the carrier signal from the first sub process; and processing reflected signal envelope samples to recover the binary inside data.

3. The method of claim 2, wherein the signal toggling arrangement comprises a metal oxide semiconductor field-effect transistor.

4. The method of claim 2, wherein the outside signal comprises a command word for controlling a device on the inside.

5. The method of claim 2, wherein the transducers are piezoelectric transducers.

6. The method of claim 2, wherein the carrier signal (25) has an envelope of no less than 100 megavolts.

7. A method of optimizing the frequency and power level of the carrier signal (25) of claim 2, wherein an initial frequency and a minimum power level for the carrier signal (25) are selected using an initial frequency selection algorithm, the algorithm comprising the steps of:

applying a carrier signal having a power level and a frequency at the outer side (21) of the wall (20), and stepping through a range of carrier signal frequencies at the same power level while searching for a Barker Sequence in a data envelope sent back from the inner side (22) to the outer side (21) of the wall;

terminating the initial frequency selection algorithm if a Barker sequence is detected, the detected Barker signal indicating that the power level and frequency used most recently used were adequate to send power and communications through the wall; and increasing the carrier signal power level and stepping through the range of carrier signal frequencies again if no Barker sequence is detected, and repeating the steps of increasing the carrier signal power level and then stepping through the range of carrier signal frequencies until an initial frequency and minimum power level are found which result in detection of a Barker sequence sent from the inner side (22) of the wall;

wherein after the initial frequency and minimum power level are determined using the initial frequency selection algorithm, the frequency of the carrier signal (25) is optimized to maximize power transfer from the outside transducer (10) to the inside transducer (11) using an optimization algorithm, the optimization algorithm comprising the steps of:

applying a carrier signal having said initial frequency and said minimum power level to the outer wall;

sampling and quantifying a voltage level received by a power harvesting arrangement on the inside, and sending a digital representation of the voltage level, called a voltage reading, to the outside (12);

stepping the carrier signal (25) frequency a small step in a first direction, the first direction being selected from one of up and down, and comparing the voltage level of a subsequent new voltage reading with the voltage level of the previous old voltage reading;

stepping the carrier signal (25) frequency an additional step in the first direction if the new voltage reading is higher than the old voltage reading;

stepping the carrier signal (25) frequency a step in a second direction opposite the first direction if the new voltage reading is lower than the old voltage reading; and repeating the process of stepping the carrier signal frequency in the same direction when the previous step resulted in a higher voltage reading, and stepping the carrier signal in the opposite direction when the previous step resulted in a lower voltage reading.

8. The method of claim 7, wherein the optimization algorithm runs continuously to continuously adjust the carrier signal frequency to maximize power transfer efficiency from the outside transducer (10) to the inside transducer (11).

9. The method of claim 7, wherein the optimization algorithm automatically runs periodically to update the carrier signal frequency to maximize power transfer efficiency from the outside transducer (10) to the inside transducer (11).

10. The method of claim 7, wherein the optimization algorithm ends when the new voltage reading and old voltage reading are equal.

11. The method of claim 7, wherein the optimization algorithm ends when the algorithm reaches a frequency where increasing the frequency of the carrier signal by one step and decreasing the frequency of the carrier signal by one step both result in lower voltage readings.

12. The method of claim 2, wherein the step of monitoring variations in the amplitude of a voltage applied across the outside transducer is accomplished including by monitoring a voltage divider comprising a power amplifier.

13. The method of claim 2, wherein the wall is a metallic hull of a water craft.

14. The method of claim 2, wherein for the step of translating a plurality of envelope samples into a plurality of translated binary bits using a logic device, the logic device is a complex programmable logic device.

15. The method of claim 2, wherein an outside-to-inside data rate is a sub-multiple of an inside-to-outside packet rate.

16. The method of claim 2, wherein an inside clock is derived from the carrier signal applied to the outer side of the wall for outside-to-inside communication, the inside clock being derived including by using a comparator.

17. The method of claim 16, wherein an inside-to-outside data rate is selected by frequency dividing the clock.

18. The method of claim 17, wherein the wherein the carrier signal has a carrier frequency, and wherein the inside-to-outside data rate is a sub-multiple of the carrier frequency.

19. The method of claim 18, wherein the inside-to-outside data rate is determined by dividing down the carrier frequency by a power of two.

20. The method of claim 2, wherein an inside-to-outside data rate can be dynamically changed while the transducers are in operation, and wherein and outside-to-inside data rate is automatically adjusted in response to such changes.

21. The method of claim 2, wherein an inside-to-outside data rate can be dynamically changed while the transducers are in operation, wherein an outside-to-inside data rate is left constant when the inside-to-outside data rate is changed, and an inside envelope sample rate is changed to compensate for the change in the inside-to-outside data rate.

* * * * *